(No Model.) 6 Sheets—Sheet 1.

R. WIRTH.
MACHINE FOR MAKING LACE FASTENERS.

No. 592,462. Patented Oct. 26, 1897.

Fig.1.

Witnesses
Inventor
Rodolphe Wirth
by Morron & Darby attys (No Model.) 6 Sheets—Sheet 2.

R. WIRTH.
MACHINE FOR MAKING LACE FASTENERS.

No. 592,462. Patented Oct. 26, 1897.

Witnesses.

Inventor
Rodolphe Wirth
Brown & Darby
Atty's (No Model.) 6 Sheets—Sheet 3.

R. WIRTH.
MACHINE FOR MAKING LACE FASTENERS.

No. 592,462. Patented Oct. 26, 1897.

Witnesses.
Wm. N. Rheem.
Wm. J. Henning.

Inventor
Rodolphe Wirth
by Browr & Darby
att'ys (No Model.) 6 Sheets—Sheet 4.

R. WIRTH.
MACHINE FOR MAKING LACE FASTENERS.

No. 592,462. Patented Oct. 26, 1897.

Fig.6.

Witnesses.
Inventor.
Rodolphe Wirth
by Brown & Darby
Att'ys (No Model.) 6 Sheets—Sheet 5.

R. WIRTH.
MACHINE FOR MAKING LACE FASTENERS.

No. 592,462. Patented Oct. 26, 1897.

Witnesses.
Wm. N. Rheem
Wm. J. Henning

Inventor
Rodolphe Wirth
by Brown & Darby
att'ys (No Model.)  6 Sheets—Sheet 6.

R. WIRTH.
MACHINE FOR MAKING LACE FASTENERS.

No. 592,462. Patented Oct. 26, 1897.

Witnesses.

Inventor
Rodolphe Wirth
by Brown & Darby attys

United States Patent Office.

RODOLPHE WIRTH, OF CHICAGO, ILLINOIS, ASSIGNOR TO THE PRATT FASTENER COMPANY, OF SAME PLACE.

MACHINE FOR MAKING LACE-FASTENERS.

SPECIFICATION forming part of Letters Patent No. 592,462, dated October 26, 1897.

Application filed June 1, 1896. Serial No. 593,947. (No model.)

*To all whom it may concern:*

Be it known that I, RODOLPHE WIRTH, a citizen of the Republic of France, residing at Chicago, in the county of Cook and State of Illinois, have invented a new and useful Machine for Making Lace-Fasteners, of which the following is a specification.

This invention relates to machines for making lace-fasteners.

The object of the invention is to provide a machine for manufacturing lace-fasteners which is simple, easily understood and operated, and efficient in operation.

A further object of the invention is to provide an apparatus for manufacturing lace-fasteners having the ends of such fasteners beveled to facilitate the insertion of the same in the article to which such fasteners are to be applied.

A further object of the invention is to provide an apparatus for manufacturing lace-fasteners wherein the ends of such fasteners are beveled in different planes.

Other objects of the invention will more fully appear hereinafter.

The invention consists substantially in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon.

In carrying out my invention I provide a suitable table A, suitably supported and arranged to support the several operating parts of the operating apparatus. Suitably journaled in the framework of the machine is the main drive-shaft B, having a driving-pulley C thereon adapted to receive rotation from any suitable source of power. In suitable bearings mounted upon table A is journaled shaft D, adapted to be driven from the main or power shaft B in any suitable manner and by means of the gears E F, whereby any suitable or desirable speed of rotation may be imparted to said shaft D, which shaft comprises what I shall term the "main" shaft of the machine.

In the particular form of apparatus shown I have illustrated the machine as a duplex arrangement—that is, an arrangement wherein two fasteners are made simultaneously—but it is obvious that the principles of my invention may be embodied in a machine for operating on one or a number of fasteners simultaneously. I do not desire, therefore, to be limited or restricted in this particular. In the form of apparatus shown—namely, in the duplex arrangement—I journal the shafts G in suitable bearings formed at opposite sides of the frame or table A and drive said shafts G from main shaft D in any suitable manner, as by means of intermeshing gears H, as shown, and from shaft G, I operate the mechanism for beveling the ends of the strip of material from which the fasteners are made, as will more fully appear hereinafter. In bearings carried upon the framework or table A of the machine and conveniently arranged with reference to the main shaft D is a mandrel J, which I shall hereinafter designate the "coiling-mandrel," and upon said mandrel I mount, at the other end thereof, the coiling-chucks K. In the particular form shown I mount a coiling-chuck K upon each end of the coiling-mandrel J. Upon mandrel J, I mount a gear L and arrange the same to mesh with the gear-teeth of a rack M, which in the form shown comprises a segment-rack carried upon an arm or lever N, suitably pivoted in the framework of the machine, as at P, and arranged to be engaged by a cam Q upon the main shaft D. A spring R serves to maintain said arm in constant engagement with the cam Q, the action of said spring being assisted by a counterweight S, as shown. The gear L and the rack M are so relatively proportioned as to size and number of gear-teeth that when said rack is actuated by the cam Q spindle J is rotated, preferably, though not necessarily, one complete revolution and an additional half-revolution to form the fastener, as will be more fully hereinafter explained, and, in addition, the coiling-shaft J is rotated by said cam Q slightly—for instance, say one-quarter of a revolution beyond the additional half-revolution mentioned—and under the influence of weight S and spring R is permitted or caused to rebound or reversely rotate the extent of such additional quarter-revolution for a purpose presently to be more fully explained. This additional quarter-revolution is imparted to quarter-shaft J by the peculiar shape of the cam Q. For instance, in Fig. 7 said cam Q is shown as provided with a protruding portion or tooth 17 for accomplishing this purpose.

Figure 1:
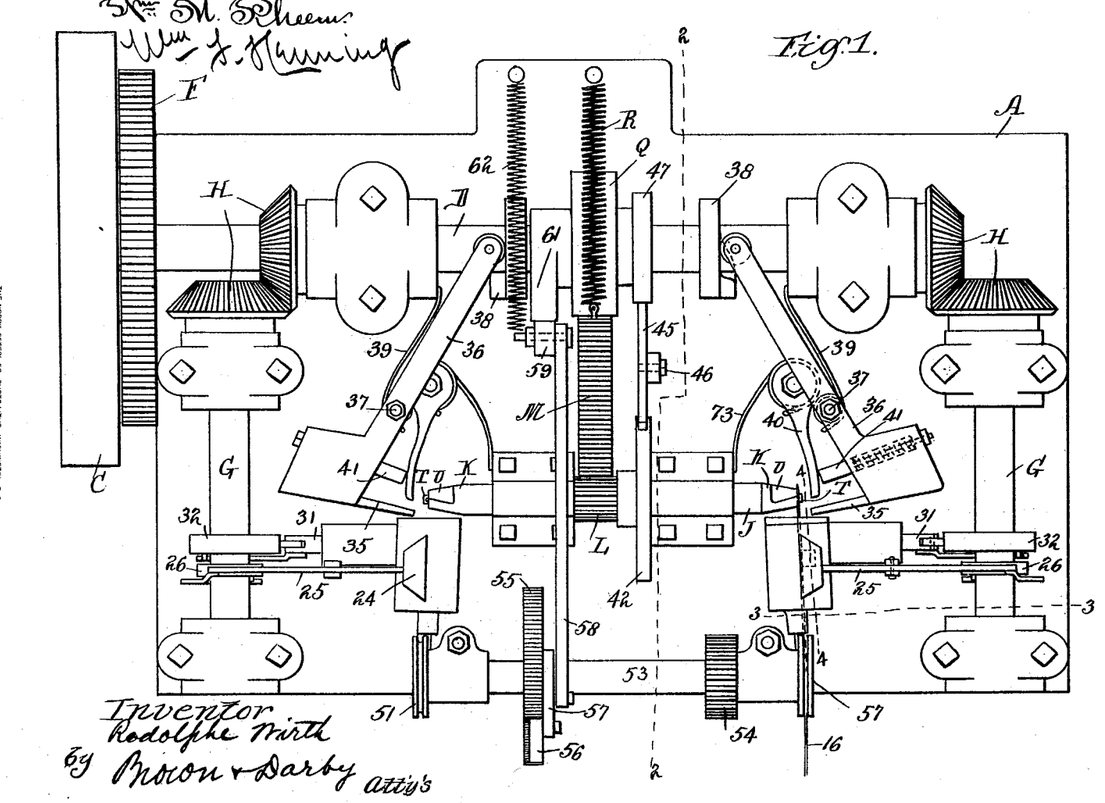
Figure 1 is a plan view of an apparatus embodying the principles of my invention.
Figure 2:
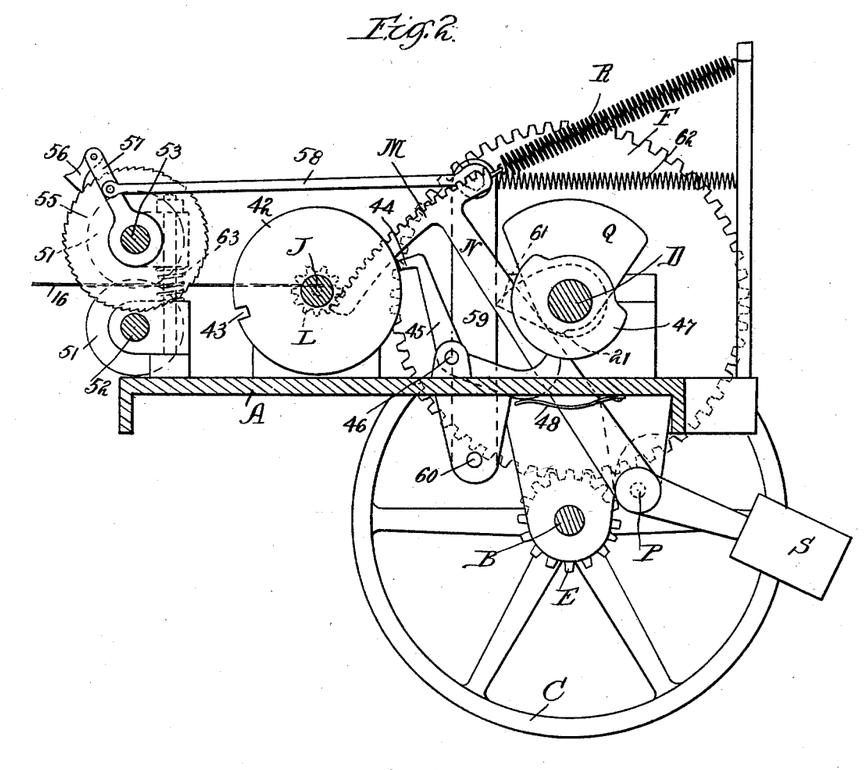
Fig. 2 is a transverse sectional elevation of the same on the line 2 2, Fig. 1.
Figure 3:
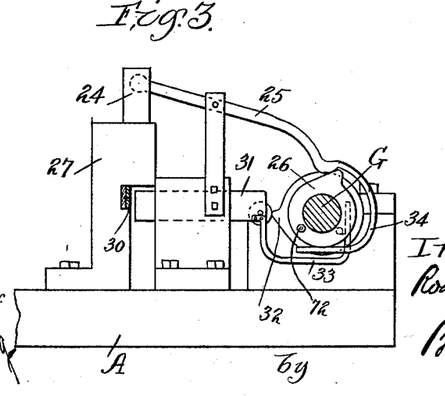
Fig. 3 is a detailed view in sectional elevation on the line 3 3 of Fig. 1.

It is important to provide means whereby the end of the strip 16 may be clamped or engaged by the coiling-chuck K in order that the coiling of said strip 16 into circular convolutions may be effected. In order to accomplish this purpose, I provide the end of the coiling-chuck K with a lip 18, as most clearly shown in Figs. 4 and 5, and between said lip 18 and the cylindrical portion T the end of the strip 16 is fed, said end being fed a sufficient distance for the end 14 of the completed fastener to project beyond said cylindrical portion, as clearly shown. In order that the coils or convolutions into which the strip of material is bent to form the body of the fastener may lie in the surface of a cylinder instead of lying in the same plane, as in the case of a spiral spring, I provide the end surface 19 of the coiling-chuck upon a slight incline relative to the line of feed of the strip 16. Therefore when the end of said strip is engaged by the overhanging lip 18 of the coiling-chuck and said coiling-chuck is rotated to form the convolutions of the fastener said convolutions will be formed alongside of each other instead of being superimposed upon each other. In order that a clamping action may occur as soon as a sufficient length of the strip has been fed between the lip 18 and the cylindrical portion T of the coiling-chuck, I impart to the coiling-chuck a slight initial rotation. This may be effected, as in the construction illustrated in Fig. 2, by means of the shoulder 21, formed on the cam Q, by which the arm N carrying the segment-rack is actuated. The action of this shoulder upon the cam Q is to effect a slight initial rotation of shaft J, and hence also to chuck K, as illustrated in Fig. 4.

I will now describe the particular form of mechanism illustrated in Figs. 1 to 5, inclusive, for effecting the beveling of the ends of the coils or convolutions of the fastener. It will be understood that in order to facilitate the insertion of the ends of the fastener through the leather or other material to which the fastener is to be applied it is important that the ends of the fastener be beveled, as clearly shown in Fig. 13, and in the form of fastener which it is the purpose of this machine to produce the ends of the fastener are bent into angular relation with respect to the plane of the coils of the body portion thereof, and after being inserted through the material to which the fastener is to be applied the ends of the fastener are bent or clenched upon the under side of such material, such ends being bent or clenched in directions angularly with respect to each other, as more fully shown and described in Patent No. 559,463, issued May 5, 1896, to Charles H. Pratt, and by reason of this bending of the ends of the fastener in opposite directions with respect to each other upon the end surface of the material or fabric to which the fastener is applied it is important that said ends 14 15 of the fastener be beveled in planes angularly with respect to each other, in order to facilitate the bending of such ends during the clenching operation. I have shown in said Figs. 1 to 5, inclusive, as illustrative of the idea involved, a form of mechanism for accomplishing the beveling of the ends of the fastener in opposite planes. In carrying out this idea I employ the reciprocatory beveling-cutters 22 23, arranged to operate in lines angularly with respect to each other. The beveling-cutter 22, which is arranged to form the bevel on the front end 14 of the fastener, is carried in a reciprocating block 24, which is arranged to be reciprocated by means of a lever 25, suitably pivoted and arranged to be engaged and actuated by a cam 26 upon the shaft G. The plunger-block 24 is arranged to slide vertically in a suitable casing 27, and yieldingly mounted on said plunger-block 24 is a presser-foot 28, which is arranged to engage and hold the strip 16 during the action of said beveling-cutter 22, the spring 29 serving to provide the yielding resistance of said presser-foot 28. The casing 27 has mounted thereon a plate 30, which forms a guideway through which the strip 16 is fed to the chuck K and into position for the beveling-cutters to operate thereon. The beveling-cutter 23 is carried in a slide or plunger 31, which is arranged to operate horizontally and be acted upon by cam 32 upon shaft G. The plunger 31 and the pivoted lever 25 are provided with the arms 33 34, by which said plunger and lever are respectively maintained in engagement with their operating-cams 26 32 and by which said lever and plunger are positively actuated in both directions. It will be observed that each of the cams 26 32 is so shaped as to impart a rapid movement to the parts respectively actuated thereby at the point where such action is required.

Figure 4:
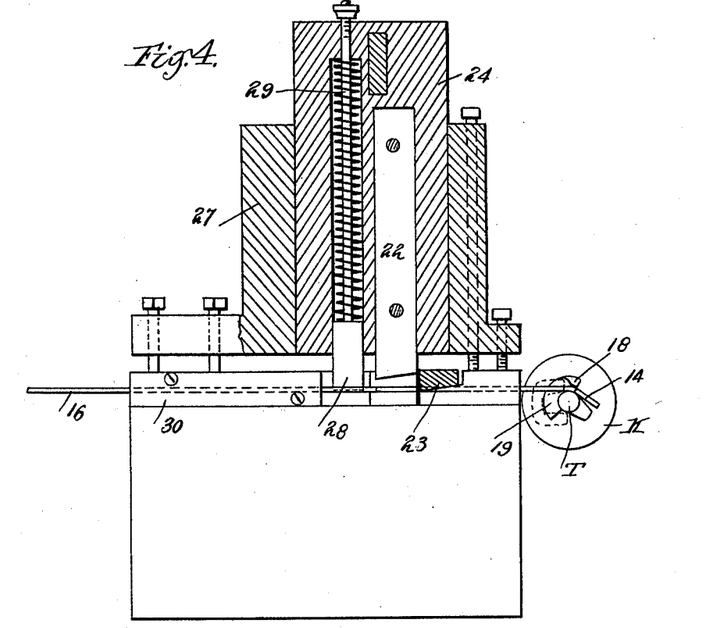
Fig. 4 is a detailed sectional elevation of the plunger carrying the beveling-cutter, illustrating the operation of beveling the ends of the fastener, said view being taken on the line 4 4, Fig. 1.
Figure 5:
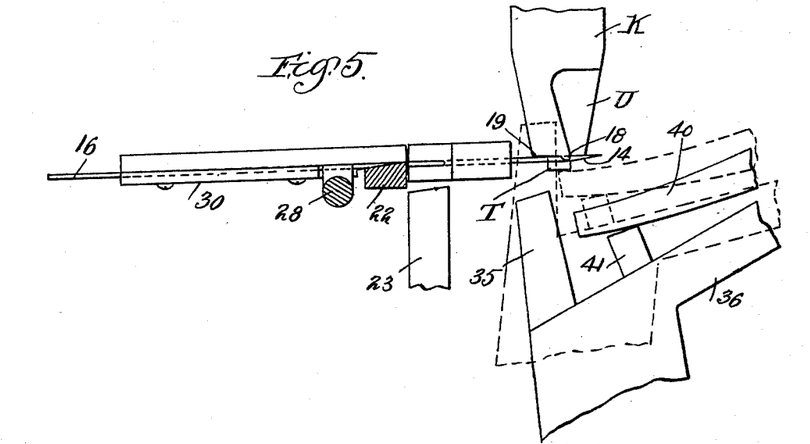
Fig. 5 is a broken diagrammatic detail view, parts being in section, illustrating the beveling and bending operations.

The severing of the portion of strip 16 which is to form the fastener is effected by the beveling-cutter 23 in the particular form of construction illustrated in Figs. 1 to 5, inclusive, and in order to effect such severing, and also the proper beveling of the ends of the fastener, the beveling-cutters 22 23 are suitably inclined upon their cutting edges, as clearly indicated in Figs. 4 and 5, to effect such beveling and severing operations with a shearing cut. The operation of the plungers 24 and 31 carrying the beveling-cutters is so timed that said cutters are advanced to their work at the moment when the chuck K has been given its initial slight rotation, as shown in Fig. 4. Therefore it will be seen from this construction that when the shaft J and the chuck K carried thereby are rotated to effect a coiling of the fastener upon the cylindrical portion T of the chuck the chuck is not called upon to draw or feed the entire strip 16 from the reel or other source from which said strip is drawn, but is required to draw only that portion of the strip which forms the individual fastener in course of manufacture. This is an important feature of the invention, for the reason that the coiling-mandrel is not called upon or required to perform any work of feeding the strip of material, and hence is not subjected to strains, which tend to twist the mandrel or vary its axis of rotation, as any such twisting or variation would be injurious to the production of a satisfactory fastener.

When the fastener has been beveled and coiled upon the cylindrical portion T of the chuck, the ends 14 15 of the fastener are bent into angular relation with respect to the plane of the convolutions of the body portion thereof. This bending of the ends of the fastener is effected by means of a plunger 35, carried in an arm 36, pivotally mounted, as at 37, and arranged to be acted upon by a cam 38 upon shaft D, and spring 39 serves to maintain said lever 36 in engagement with said cam.

In order that the formed fastener may not be twisted off the supporting cylindrical portion T of the chuck K during the bending operation, I provide and arrange a pivotally-mounted arm 40 to be yieldingly engaged by lever 36, as by means of the projecting plunger 41, yieldingly mounted in said lever 36, whereby said arm 40 is rocked into position for the front end thereof to bear against the end of the cylindrical portion T to maintain the formed fastener thereon during such bending operation, as clearly indicated in dotted and full lines in Fig. 5. It will be understood that the purpose of the cut-away portion U of the chuck K is to provide a ledge which acts as a die and over which the ends 14 15 of the fastener are bent during the bending operation and also to receive the bending-plunger 35.

In order that the mandrel J and the chuck K may be prevented from rotating during the bending operation, it is important to lock said mandrel during such bending operation. In order to accomplish this purpose, I mount on said mandrel J a disk 42, having a notch 43 formed in the periphery thereof and arranged when said mandrel has been rotated to the desired point to receive the end 44 of a lever 45, pivotally mounted, as at 46, and arranged to be engaged and actuated upon by a cam 47 upon shaft D. A spring 48 serves to maintain said lever in engagement with said cam. Through the action of said cam 47 the lever 45 is rocked out of as well as into position for the end 44 thereof to be received in the notch 43, whereby said mandrel J is locked or released. It will be observed that the joint action of beveling-cutters 22 23 is to remove from the strip 16 a portion of the material thereof, as indicated in dotted lines at 50, Fig. 12, as well as to sever from strip 16 a sufficient amount or length of material to form the fastener, the severing and beveling cutter 23 effecting a beveling of the rear end of the fastener and the beveling-cutter 22 effecting a beveling of the front end of the strip 16 for the next succeeding fastener.

When the portion of strip 16 to form the fastener has been severed with the rear end thereof beveled, as above described, through the action of beveling-cutter 23, and said portion of the strip is formed into a fastener and the ends thereof bent into angular relation with reference to the plane of the coils or convolutions of the body portion of such fastener, it is important to feed the end of the strip 16 which has been suitably beveled by the beveling-cutter 22, upon the front end thereof, for the next succeeding fastener, in order that said end may be advanced into position to enter the space between overhanging lip 18 and the cylindrical portion T of the coiling-chuck. In order to accomplish this result, I mount in convenient position upon the framework of the machine the grooved feeding-rollers 51, said rollers, as shown, being arranged in pairs, the members of each pair being arranged in the same plane with each other and preferably provided with peripheral grooves to receive the strip 16 of material to be fed. The feed-rolls 51 are arranged upon shafts 52 53, provided with intermeshing gears 54, by which said shafts are rotated in opposite directions. Upon shaft 53 is mounted a ratchet disk or wheel 55, arranged to be engaged by a pawl 56 in the particular form shown in Figs. 1 and 2, which pawl is carried upon an arm 57, sleeved upon said shaft 53 and arranged to be engaged and locked by a link 58, connected to a lever 59, pivotally mounted, as at 60, said lever 59 being periodically rocked by a cam 61 upon shaft D. A spring 62 serves to maintain said lever 59 in engagement with said cam. A slight relative lateral yielding of shafts 52 53 with respect to each other is permitted by supporting the journal-boxes of one of said shafts—as, for instance, shaft 53—upon springs 63, as indicated in dotted lines in Fig. 2 and in full lines in Fig. 7.

The cam 61 is so timed as to its action with reference to other parts of the apparatus that it will effect a throw of lever 59 and connecting link or rod 58 at the proper time to effect a rotation of shafts 52 53 to feed forward the strip 16 as soon as the previously-beveled detached portion of such strip has been coiled into a fastener and is ready to be ejected from the coiling-chuck K. The advancing end of strip 16, which has been provided with the proper bevel and in the proper plane by the beveling-cutter 22, enters wedge-like between the previously-formed fastener, which up to this point has remained upon the cylindrical portion T of the chuck and the wall 19 of the end of the chuck, thereby effecting a detachment of the previously-formed fastener and the ejection thereof from the cylindrical portion of said chuck. The plungers 24 and 31 are again actuated to again cut the bevels for the next succeeding fastener, which is in a manner, as above explained, coiled into fastener form and similarly ejected by the next succeeding fastener, and so on.

The purpose of imparting to the coiling-mandrel J an additional quarter-revolution and permitting a rebound will now be understood, as such rebound effects a loosening of the formed fastener upon the cylindrical portion T of the coiling-chuck, whereby the adjustment and removal of the formed fastener from the coiling-chuck are facilitated.

Figure 6:
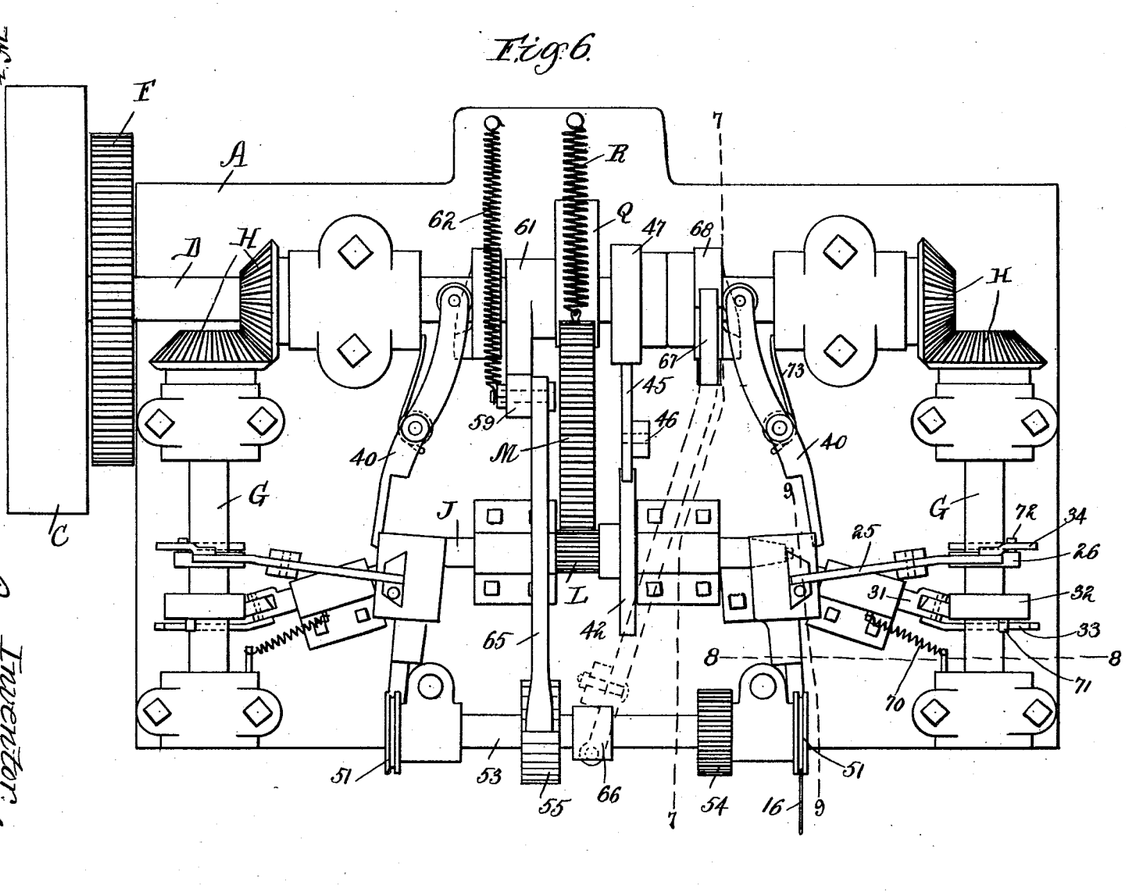
Fig. 6 is a view in plan of a slightly-modified arrangement of apparatus embodying the principles of my invention.
Figure 7:
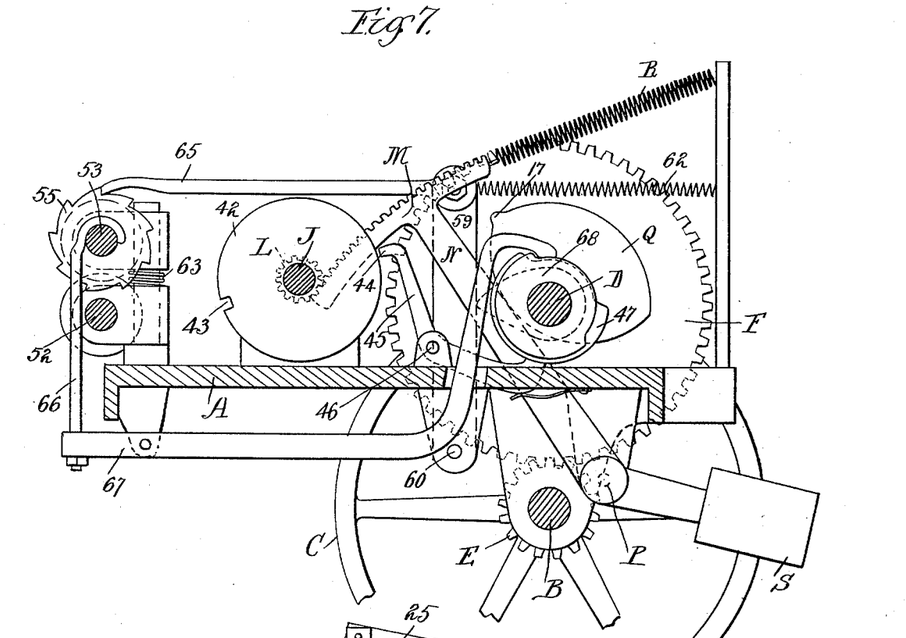
Fig. 7 is a transverse sectional elevation of the same on the line 7 7 of Fig. 6.
Figures 9, 10, 11, 12, 13:
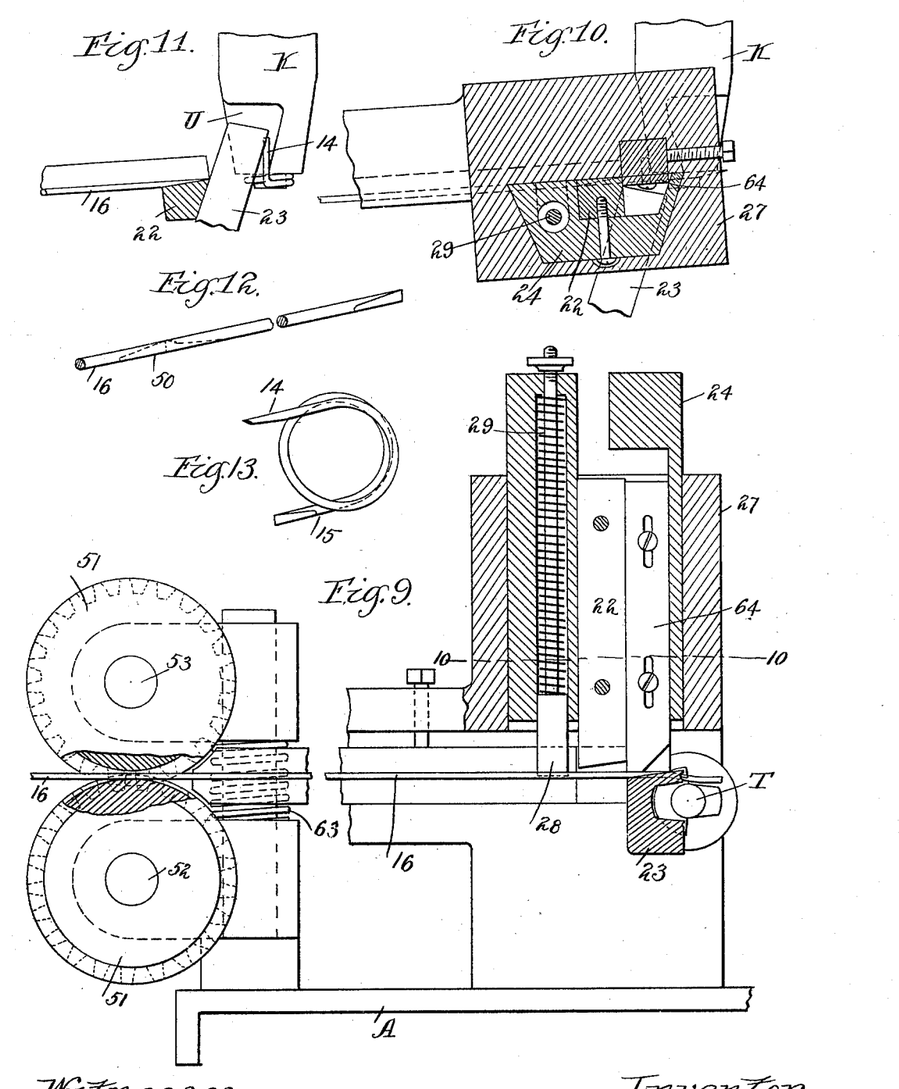
Fig. 9 is a detailed broken view, parts being in vertical section, on the line 9 9, Fig. 6.
Fig 10 is a broken detail view in transvere horizontal section on the line 10 10 of Fig. 9.
Fig. 11 is a broken detail view in plan, illustrating the operation of bending the ends of the fastener.
Fig. 12 is a detailed view illustrating the manner of beveling the ends of the strip of material from which the fasteners are made.
Fig. 13 is a detailed view in plan showing the fastener coiled and having its ends beveled, but before such ends are bent to complete the fastener.

In Figs. 6, 7, and 9 I have shown a slightly-modified arrangement of apparatus wherein the beveling and severing cutter 23 also effects a bending of the ends of the fastener, as clearly indicated in Figs. 9, 10, and 11. In the form of construction shown in these figures of the drawings the fastener is not severed and beveled until after it has been completely coiled, and the severing-cutter 23, which also bevels the rear end of the formed fastener, effects also a bending of the beveled ends of the fastener, being forked or grooved, as clearly shown in Fig. 9, for that purpose. In other respects the operation of the severing-cutters 22 23 is substantially the same in both forms of apparatus illustrated, the cutter 23 beveling the rear end of the fastener, severing the formed fastener from the strip 16 and bending the ends of the formed fastener in angular relation with respect to the plane of the convolutions of the fastener, while the cutter 22 effects a beveling in suitable relation with respect to the rear end of the previously-formed fastener of the end of the strip 16 from which the previously-formed fastener has been severed. A plate or presser-foot 64, adjustably mounted in plunger 24, serves to steady and hold the strip 16 and to assist the presser-foot 28 during the beveling and severing operations. In this construction, however, it will be observed that a pull on strip 16 is required to be exerted by the winding or coiling chuck K in order to draw a sufficient amount of said strip to form the coils or convolutions of the fastener. In order, therefore, that the detached or front end of strip 16 may be advanced to be again engaged by the coiling-chuck when the previously-formed fastener has been completed, it is necessary to provide means for effecting such adjustment of the front end of said strip 16. In order to accomplish this result, I arrange the ratchet wheel or disk 55 upon shaft 53 of the feeding-disks 51 to be engaged by the pawl or arm 65, connected to the lever 59, which is operated as above explained and in a similar manner by cam 61 upon shaft D. In this construction it is also desirable to remove any restriction from the free feed of strip 16 during the coiling of the fastener upon chuck K. I therefore provide means for permitting the members of the pairs of feeding-rolls 51 to slightly move away from each other during the coiling operation, said means being adapted to again close the members of said pairs of rolls upon each other and to effect a feeding of the free end of strip 16 to form the next succeeding fastener. These means comprise a hook 66, carried by a lever 67, which is periodically rocked at the proper time by means of a suitable cam 68 upon shaft D. The hook 66 is arranged to engage shaft 53 and periodically draw or move said shaft against the action of spring 63, upon which the bearings for said shaft are supported, thereby effecting a clamping of the strip of material between the members of pairs of feeding-rolls 51 at the point when said shaft 53 is rotated or advanced by the pawl-arm 65, as above explained.

If desired, and in order to reduce the friction of the parts, I may interpose friction-rollers between the various operating-cams and the parts engaged thereby, as indicated in the drawings.

Figure 8:
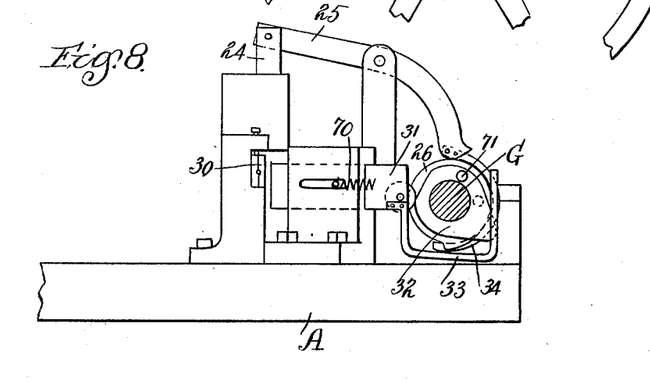
Fig. 8 is a broken sectional detailed view in elevation on the line 8 8 of Fig. 6.

If desired, the plunger 31 may be opposed in its advancement by spring 70, as indicated in Figs. 6 and 8, the pin 71, however, being ordinarily sufficient to return said plunger when said pin engages the arm 33. In similar manner the pin 72 is ordinarily sufficient by its engagement with arm 34 to positively return plunger 24.

The arm 40, which engages the end of cylindrical portion T of the coiling-chuck to maintain the formed fastener thereon, may be provided with a spring 73, against the action of which said arm is moved toward said chuck and by which said arm is returned to its normal position.

Many variations and alterations in the details of construction and arrangement of parts will readily suggest themselves to persons skilled in the art and still fall within the spirit and scope of my invention. I do not desire, therefore, to be limited or restricted to the exact details shown and described; but, Having now set forth the object and nature of my invention and a form of apparatus embodying the same, and having specifically described the construction, function, and mode of operation of said apparatus, what I claim as new and useful and of my own invention, and desire to secure by Letters Patent of the United States, is—

1. In a machine for making lace-fasteners, a coiling-mandrel adapted to receive the material from which the fastener is made, means for rotating said mandrel, whereby said material is coiled thereon to form the body of the fastener, in combination with means for beveling the ends of the material required for each fastener, and means for bending the ends of the fastener after it is formed at substantially right angles with the plane of the coils thereof; as and for the purpose set forth.

2. In a machine for making lace-fasteners, a coiling-mandrel adapted to receive the strip of material from which the fastener is made, means for rotating said mandrel, whereby said material is coiled on said mandrel to form the body of the fastener, means for feeding the material to said mandrel, means for severing a sufficient length from the strip of material to form the fastener, means for beveling the ends of the fastener, and means for simultaneously bending the ends of the fastener after it is formed at substantially right angles to the plane of the coils thereof; as and for the purpose set forth.

3. In a machine for making lace-fasteners, a coiling-mandrel adapted to receive and coil thereon the material from which the fastener is made, in combination with means for beveling the ends of the fastener in planes angularly with respect to each other, and means for bending the ends of the formed fastener at substantially right angles to the plane of the coils of the body thereof; as and for the purpose set forth.

4. In a machine for making lace-fasteners, a coiling-mandrel adapted to receive the material from which the fastener is made and to coil the same thereon, in combination with beveling-cutters for beveling the ends of the fastener, means for actuating said mandrel and cutters, and means for simultaneously bending both ends of the fastener after it is formed; as and for the purpose set forth.

5. In a machine for making lace-fasteners, a coiling-mandrel adapted to receive and coil thereon the material from which the fastener is made, in combination with beveling-cutters for beveling the ends of the fastener, said cutters being arranged to bevel the said ends in planes in angular relation with respect to each other, and means for actuating said mandrel and cutters; as and for the purpose set forth.

6. In a machine for making lace-fasteners, a coiling-mandrel adapted to receive the material from which the fastener is made and to coil the same thereon, beveling-cutters arranged to bevel the ends of the fastener in planes angular with respect to each other, means for holding the material during the operation of the beveling-cutter, and means for actuating said mandrel and cutters; as and for the purpose set forth.

7. In a machine for making lace-fasteners, a coiling-mandrel adapted to grasp the end of the material from which the fastener is made, means for severing a sufficient length from said material to form a fastener, and means for rotating said mandrel, whereby said detached portion is coiled upon said mandrel into a fastener; as and for the purpose set forth.

8. In a machine for making lace-fasteners, a coiling-mandrel adapted to grasp the end of the material from which the fastener is made, means for severing a sufficient length from said material to form a fastener, means for rotating said mandrel, whereby said detached portion is coiled thereon, and means for bending the ends of the coiled detached portion in substantially right-angular relation with respect to the planes of the coils thereof; as and for the purpose set forth.

9. In a machine for making lace-fasteners, a beveling-cutter arranged to bevel the front ends of the strip of material from which the fastener is made, a coiling-mandrel adapted to grasp said beveled front end, means for severing a sufficient length of said material to form the fastener, and means for rotating said mandrel to coil the fastener thereon; as and for the purpose set forth.

10. In a machine for making lace-fasteners, means for beveling the forward end of the strip of material from which the fastener is made, a coiling-mandrel adapted to grasp said beveled forward end, means for severing from said strip a sufficient length thereof to form a fastener, means for beveling the severed end of said portion, and means for rotating said mandrel, whereby said severed and beveled ended portion is coiled upon said mandrel into a fastener; as and for the purpose set forth.

11. In a machine for making lace-fasteners, means for beveling the forward end of the strip of material from which the fastener is made, a coiling-mandrel adapted to grasp the beveled forward end, means for severing from said strip a sufficient length thereof to form a fastener, means for beveling the severed end of said portion, and means for rotating said mandrel, whereby said severed and beveled ended portion is coiled into a fastener upon said mandrel, and means for bending the ends of the formed fastener into angular relation with respect to the plane of the coils thereof; as and for the purpose set forth.

12. In a machine for making lace-fasteners, means for beveling the forward end of the strip of material from which the fastener is made, a coiling-mandrel adapted to grasp said beveled forward end, means for simultaneously severing and beveling a sufficient length from said strip to form a fastener, means for rotating said mandrel whereby the body of the fastener is coiled thereon, and means for bending the ends of the formed fastener into angular relation with respect to the plane of the coils thereof; as and for the purpose set forth.

13. In a machine for making lace-fasteners, a coiling-mandrel adapted to grasp the end of the material from which the mandrel is made, means for imparting to said mandrel a slight initial and a rapid final rotation, whereby said material is first clamped and then coiled upon said mandrel, and means for severing from said strip a sufficient length thereof to form a fastener; as and for the purpose set forth.

14. In a machine for making lace-fasteners, a coiling-mandrel provided with a chuck having a body part and a projecting lip, the end of the material from which the fastener is made adapted to be inserted between said lip and body part and means for imparting a slight initial rotation to such mandrel, whereby the material to form the fastener is clamped by said lip; as and for the purpose set forth.

15. In a machine for making lace-fasteners, a coiling-mandrel provided with a chuck, having a cylindrical portion upon which the fastener is formed, and a projecting lip, the end of the material from which the fastener is made adapted to be received between said cylindrical portion and said lip, and means for imparting a slight initial rotation and a rapid final rotation to said mandrel, whereby said material is first clamped and then coiled upon said mandrel; as and for the purpose set forth.

16. In a machine for making lace-fasteners, a coiling-mandrel provided with a chuck having an end wall and a coiling portion projecting therefrom, upon which the body of the fastener is coiled, a portion of the plane of said end wall lying in a plane angular with respect to the axis of rotation of such mandrel, in combination with means for beveling the forward end of the strip from which the fastener is made; as and for the purpose set forth.

17. In a machine for making lace-fasteners, a coiling-mandrel provided with a chuck having one side thereof cut away, said chuck adapted to grasp and coil thereon the material from which the fastener is made, in combination with means for simultaneously severing the formed fastener from the material from which it is made and beveling the severed end thereof, and bending both ends into the space formed by such cut-away portion; as and for the purpose set forth.

18. In a machine for making lace-fasteners, a coiling-mandrel adapted to grasp the end of the material from which the fastener is made, means for severing a sufficient length from said strip to form a fastener, means for rotating said mandrel to coil the body portion of the fastener thereon, means for beveling the forward end of the strip of material after such portion has been detached to form the front end of the next succeeding fastener, and means for advancing the beveled end of such strip to said mandrel to form the next succeeding fastener; as and for the purpose set forth.

In witness whereof I have hereunto set my hand this 21st day of May, 1896.

RODOLPHE WIRTH.

Witnesses:
 DAVID A. WALES,
 S. E. DARBY.